(12) United States Patent
Sorenson et al.

(10) Patent No.: US 8,601,670 B2
(45) Date of Patent: Dec. 10, 2013

(54) CABLE SPLINT

(75) Inventors: Larry Sorenson, New Prague, MN (US); Scott Carlson, Bloomington, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 257 days.

(21) Appl. No.: 13/045,415

(22) Filed: Mar. 10, 2011

(65) Prior Publication Data
US 2011/0154643 A1    Jun. 30, 2011

Related U.S. Application Data

(62) Division of application No. 11/975,370, filed on Oct. 17, 2007, now Pat. No. 7,926,797.

(51) Int. Cl.
*B23Q 1/00* (2006.01)

(52) U.S. Cl.
USPC ............................ 29/559; 269/45; 29/869

(58) Field of Classification Search
USPC ............... 269/45, 228, 138, 139, 903, 869
See application file for complete search history.

(56) References Cited

U.S. PATENT DOCUMENTS

| | | | |
|---|---|---|---|
| 3,872,760 A | 3/1975 | Desnoyers, Jr. | |
| 6,113,088 A | 9/2000 | Gakhar et al. | |
| 6,116,588 A | 9/2000 | Yamane | |
| 6,158,729 A * | 12/2000 | Tsai | 269/228 |
| 6,364,302 B2 | 4/2002 | Ausilio | |
| 6,412,158 B1 | 7/2002 | Moore | |
| 7,144,003 B1 * | 12/2006 | Meade | 269/43 |
| 7,926,797 B2 * | 4/2011 | Sorenson et al. | 269/45 |
| 2006/0233509 A1 * | 10/2006 | Ray et al. | 385/136 |
| 2009/0100674 A1 * | 4/2009 | Sorenson et al. | 29/869 |

FOREIGN PATENT DOCUMENTS

| | | |
|---|---|---|
| DE | 3428274 A1 | 1/1986 |
| EP | 0 147 162 A2 | 7/1985 |
| EP | 0 358 214 A2 | 3/1990 |
| EP | 0 803 753 A1 | 10/1997 |
| WO | WO 2004/040347 A1 | 5/2004 |

OTHER PUBLICATIONS

International Search Report and Written Opinion mailed Jun. 5, 2009, cited in parent application U.S. Appl. No. 11/975,370, filed Oct. 17, 2007.

* cited by examiner

*Primary Examiner* — Lee D Wilson
(74) *Attorney, Agent, or Firm* — Merchant & Gould P.C.

(57) ABSTRACT

A device used to secure a section of cable while one or more fiber is broken out from the cable. The device includes spaced apart clamp assemblies that hold a cable during the splicing process to protect the fairly delicate fibers within the sheathing. The disclosure also relates to a method of splicing using a clamp assembly.

13 Claims, 7 Drawing Sheets

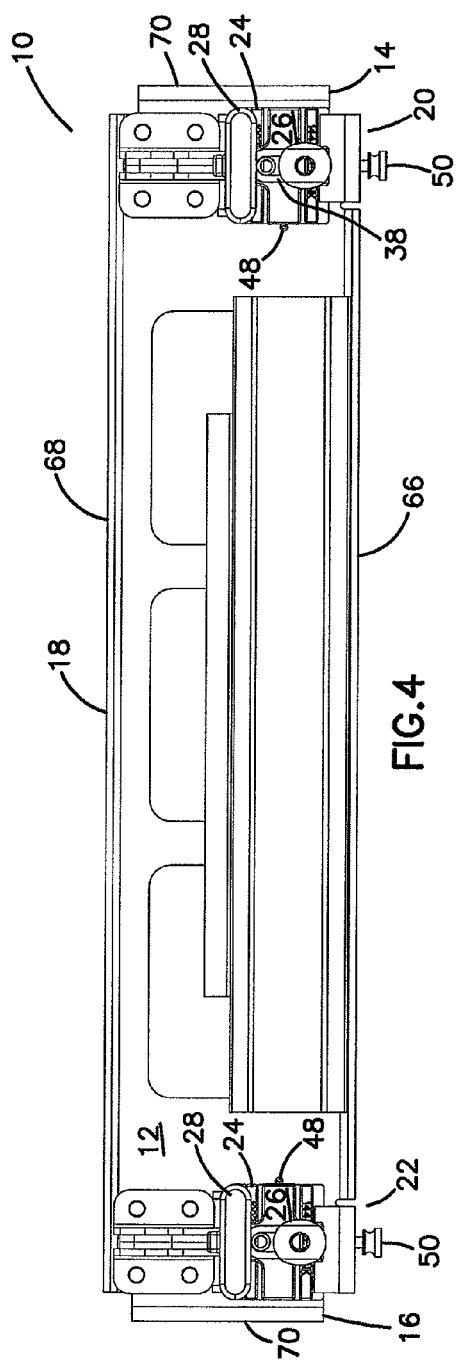
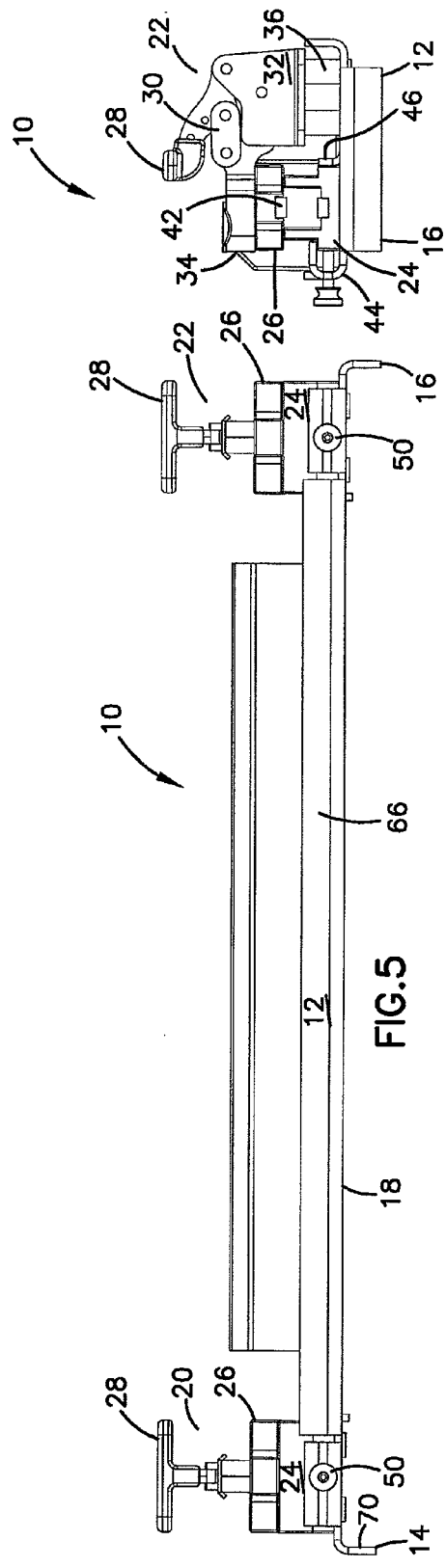
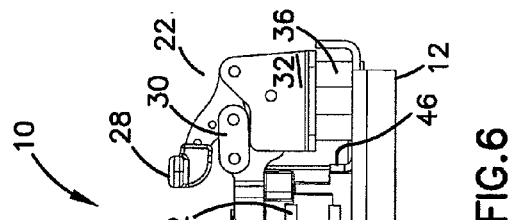

CABLE SPLINT

RELATED APPLICATIONS

This application is a divisional application of U.S. application Ser. No. 11/975,370 filed on Oct. 17, 2007, which is herein incorporated by reference in its entirety.

TECHNICAL FIELD

A device and method used to hold a section of cable while the content within the cable is accessed.

BACKGROUND

Fiber distribution cables are commonly used to connect a central office or hub to a number of end subscribers. A typical fiber distribution cable houses a large number of separate fibers, which are broken out along the length of the cable and connected to the end subscribers via secondary cables (e.g., drop cables, stub cables, etc.).

The individual or group of fibers can be broken out from the distribution cables in the field or before the cable leaves the factory. The present invention provides a device and method for breaking out fibers from a main distribution cable.

SUMMARY

The present disclosure relates to a cable holder. The cable holder can be used when splicing a main fiber distribution cable. In particular, the cable holder can be used to secure a section of cable while the outer protective sheathing is cut and select fibers therein are accessed. In some embodiments, select fibers are pulled out of the main cable to create pigtails, which connect to secondary cables (e.g., drop cables, stub cables). In such embodiments, it is desirable to overmold the splice area to protect it from being damaged in the field. The cable holder can be used to safely transport the cable from work station to work station during cable processing. The cable holder can also serves as a jig or fixture during the overmolding process. In such embodiments, the cable holder holds the section of cable in a fixed orientation and protects the section of cable from being damaged or contaminated during the overmolding process.

BRIEF DESCRIPTION OF THE DRAWINGS

FIG. 4 is a top view of the cable holder of FIG. 1;

FIG. 5 is a front view of the cable holder of FIG. 1;

FIG. 6 is an end view of the cable holder of FIG. 1;

DETAILED DESCRIPTION

Figure 1:
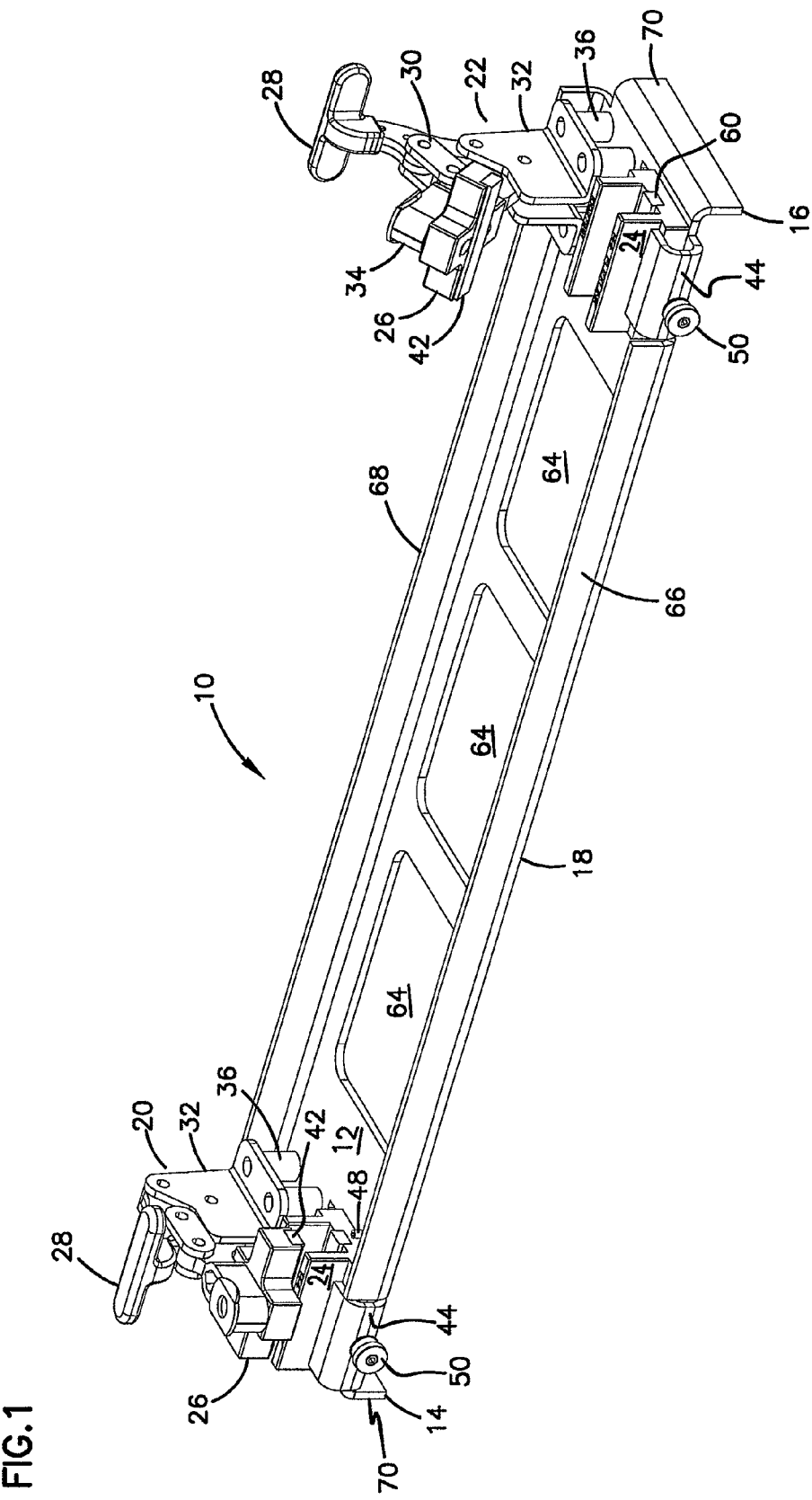
FIG. 1 is a perspective view of a cable holder according to a first embodiment of the present disclosure.

The cable holders according to the present disclosure are configured to secure a section of cable, for example, while the protective sheathing of a cable is cut and select fibers therein are accessed, while the section of cable is transported from one location to another, and/or during an overmolding process. The cable holders according to the present disclosure can be configured to hold a section of cable in a fixed orientation and protect it from being damaged (e.g., bent, bumped, contacted, or rotated) and/or contaminated. For example, during overmolding it is generally desirable to prevent the cable from bending and spinning.

Referring generally to FIGS. 1-6, a cable holder 10 according to a first embodiment of the present disclosure is shown. The cable holder 10 includes an elongated base plate 12 including a first end 14, an opposed second end 16, and a mid portion 18 therebetween. In the depicted embodiment, a first clamp assembly 20 is mounted to the first end 14, and a second clamp assembly 22 is mounted to the second end 16. Each clamp assembly includes a cable chuck 24 (also referred to herein interchangeably as an insert) configured to secure a section of cable 25 above the base plate 12.

The cable chucks 24 of each clamp assembly 20, 22 are aligned with each other to support a section of cable 25 in a parallel orientation relative to the elongated base plate 12. FIG. 1 depicts the second clamp assembly 22 in the disengaged or unlocked position, and the first clamp assembly 20 in the engaged or locked position. In the depicted embodiment each of the first and second clamp assemblies 20, 22 are identical. However, it should be appreciated that alternative embodiments of the cable holder 10 may include only one clamp assembly or multiple, different clamp assemblies.

Figure 2:
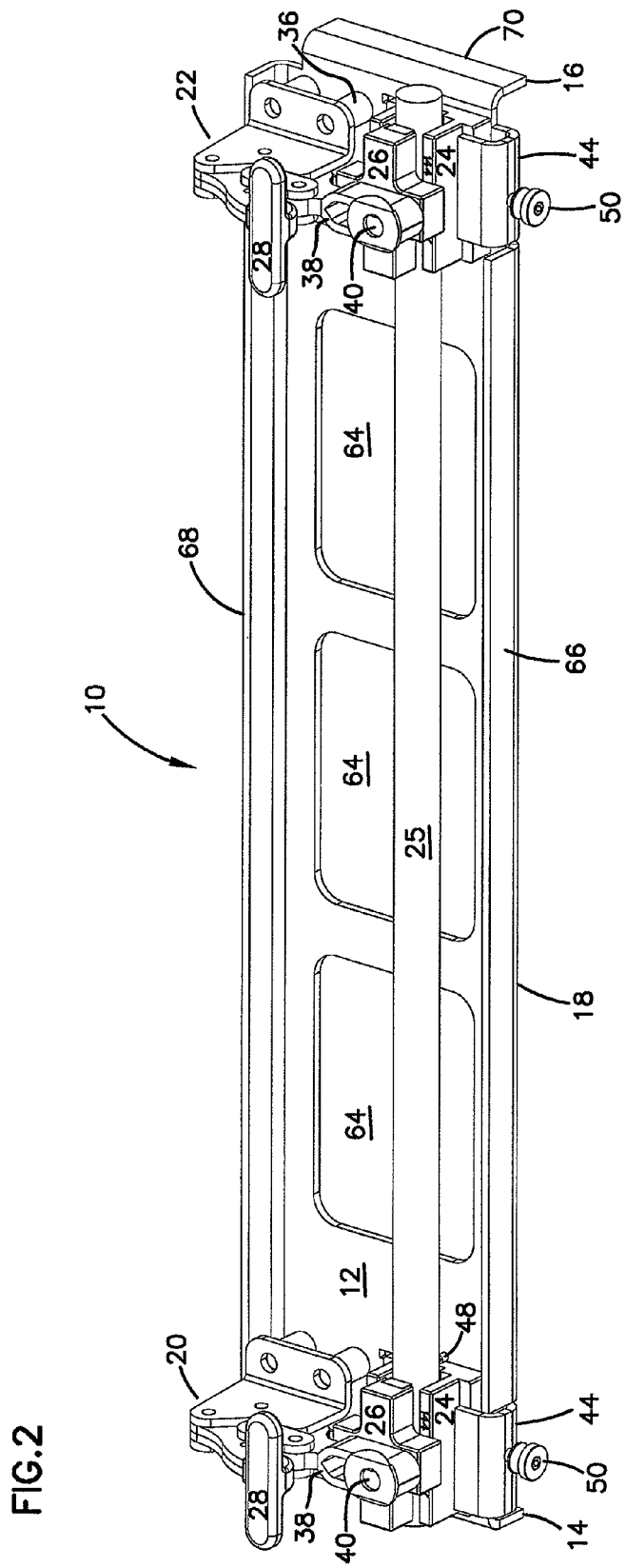
FIG. 2 is a perspective view of the cable holder of FIG. 1 with a section of cable held in the cable holder.

The clamp assemblies 20, 22 include an upper clamp portion and a lower clamp portion. In the depicted embodiment, the upper clamp portion consists of a four bar linkage bolted to the base plate 12, and the lower portion consists of a cable chuck 24 secured to the base plate 12. The upper portion of the clamp assembly is an over-center lock mechanism that includes a clamp pad 26 configured to press a section of cable 25 into the cable chuck 24. In the depicted embodiment, the four bar linkage clamp member includes a T-shaped handle 28 that is arranged relative to the connector bar 30, base bar 32, and extender 34 such that the upper clamp pad 26 locks in place when the T-shaped handle is in the downward or engaged position as shown in FIG. 2.

Referring to FIGS. 1-3, and 6, the upper portion of the clamp assembly 20, 22 is described in greater detail. In the depicted embodiment, the base bar 32 of the linkage is bolted to the base plate 12 via risers 36 and pivotally attached to the lower end of the handle 28 and the lower end of the extender bar 32. The connector bar 30 pivotally connects the handle 28 and the extender bar 34 above the lower ends and below the upper ends of the handle 28 and extender bar 34. The upper end of the extender bar 34 supports the clamp pad 26. In the depicted embodiment, the location of the clamp pad 26 relative to the extender bar 34 is adjustable. The extender bar 34 includes a slot 38 through which a bolt 40 extends to connect the clamp pad 26 to the extender bar 34 (see FIG. 2). In the depicted embodiment, the clamp pad 26 is X-shaped and includes a resilient material 42 (e.g., foam, rubber, plastic, etc.) on its bottom surface. The resilient material 42 is configured to engage the top surface of a section of cable 25.

Still referring to FIGS. 1-3, and 6, the lower portion of the clamp assembly 20, 22 is described in greater detail. The lower portion generally consists of the cable chuck 24 secured to the base plate 12. In the depicted embodiment, cable chuck 24 is configured to be interchanged depending on the diameter of the section of cable 25. In the depicted embodiment the cable chuck 24 is held to the base plate 12 via a pair of arms 44, 46 and a stopper 48. The pair of arms 44, 46, and stopper 48 allow the cable chuck to be easily engaged and disengaged from the base plate 12. In particular, they engage the base of the cable chuck and allow the cable chuck 24 to slide into engagement with the base plate 12. The front arm 44 includes a lock member 50 that interlocks with a groove 52 to secure the cable chuck in place. In some embodiments the lock member 50 is a threaded set screw, and in other embodiments it is a spring loaded boss member.

Figure 3:
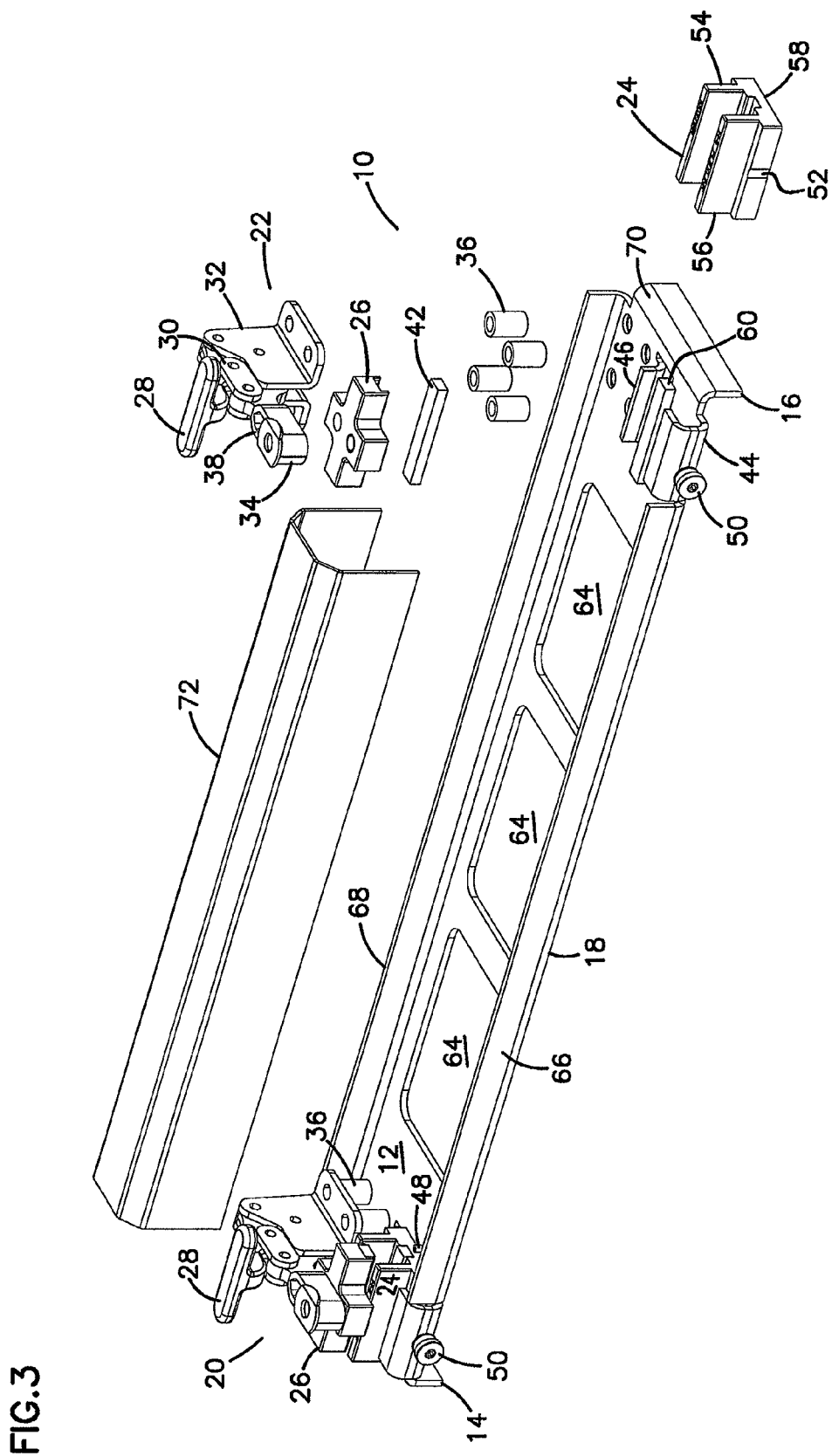
FIG. 3 is an assembly view of the cable holder of FIG. 1.

Referring to FIG. 3, the cable chuck 24 (insert) is described in greater detail. In the depicted embodiment the cable chuck 24 includes two opposed, generally parallel walls 52, 54 that extend from a base member 58. The walls 52, 54 are separated by a space that generally correlates with the diameter of the section of cable 25. In the depicted embodiment the base member 58 includes a resilient material 60 that is configured to support the bottom surface of the section of cable 25. In some embodiments the height of the walls 52, 54 is less than the distance between the resilient material 60 of the cable chuck 24 and the resilient material 42 of the clamp pad 26 when the clamp pad 26 is in the locked or engaged position.

Still referring to FIG. 3, the base plate 12 is described in greater detail. In the depicted embodiment the base plate 12 is generally rectangular in shape and includes a number of apertures 64 therein. The base plate also includes a front lip 66, a rear lip 68, and curved over end portions 70. Optionally, a hood or cover 72 is connected to the base plate 12. In some embodiments, the cover 72 is generally U-shaped and extends between the clamp assemblies 20, 22. In some cable finishing processes, the cable is coated with epoxy or silicon. During such processes it is generally desirable to protect the section of cable from contact and contamination.

Figure 7:
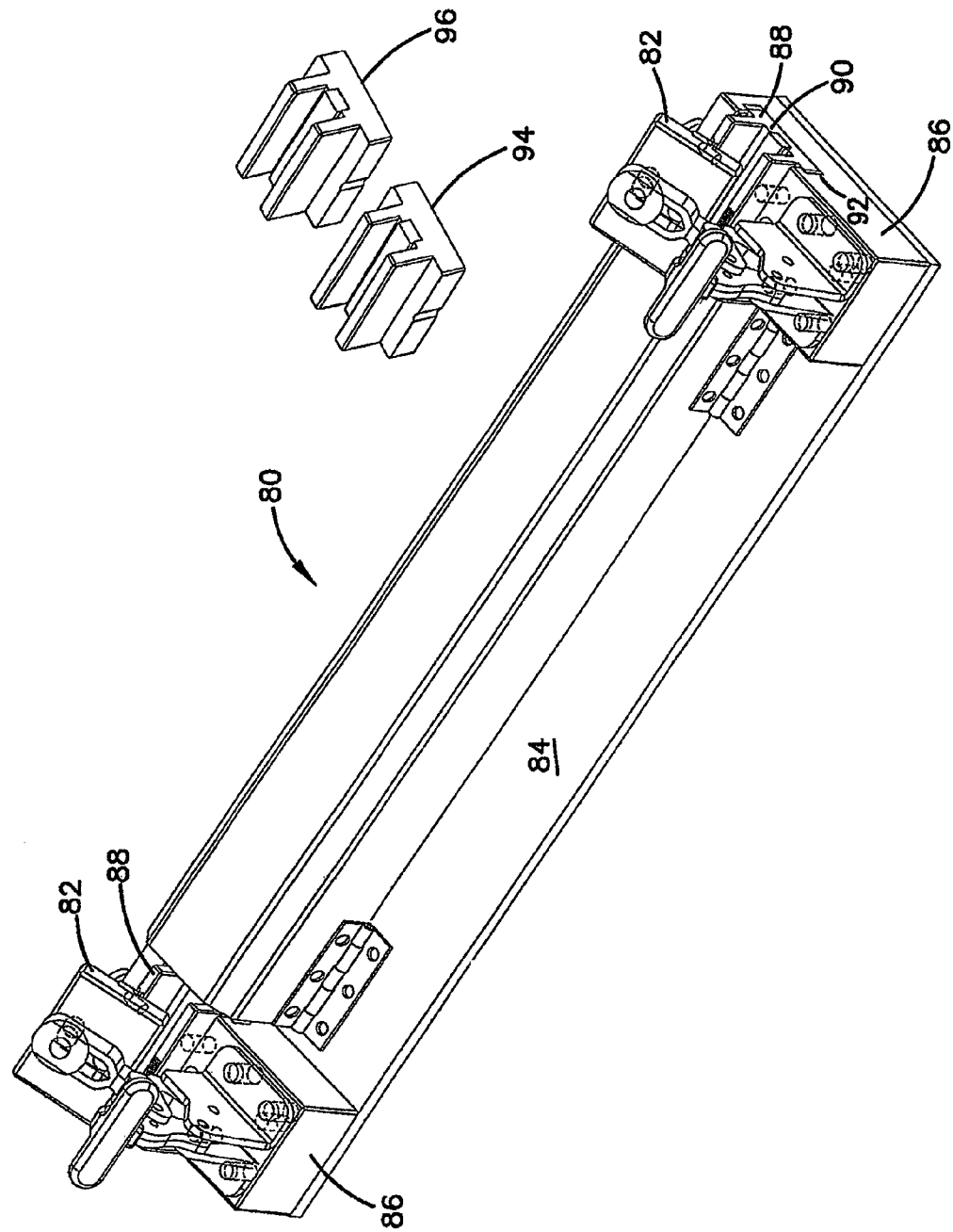
FIG. 7 is a perspective view of a cable holder according to a second embodiment of the present disclosure.
Figure 8:
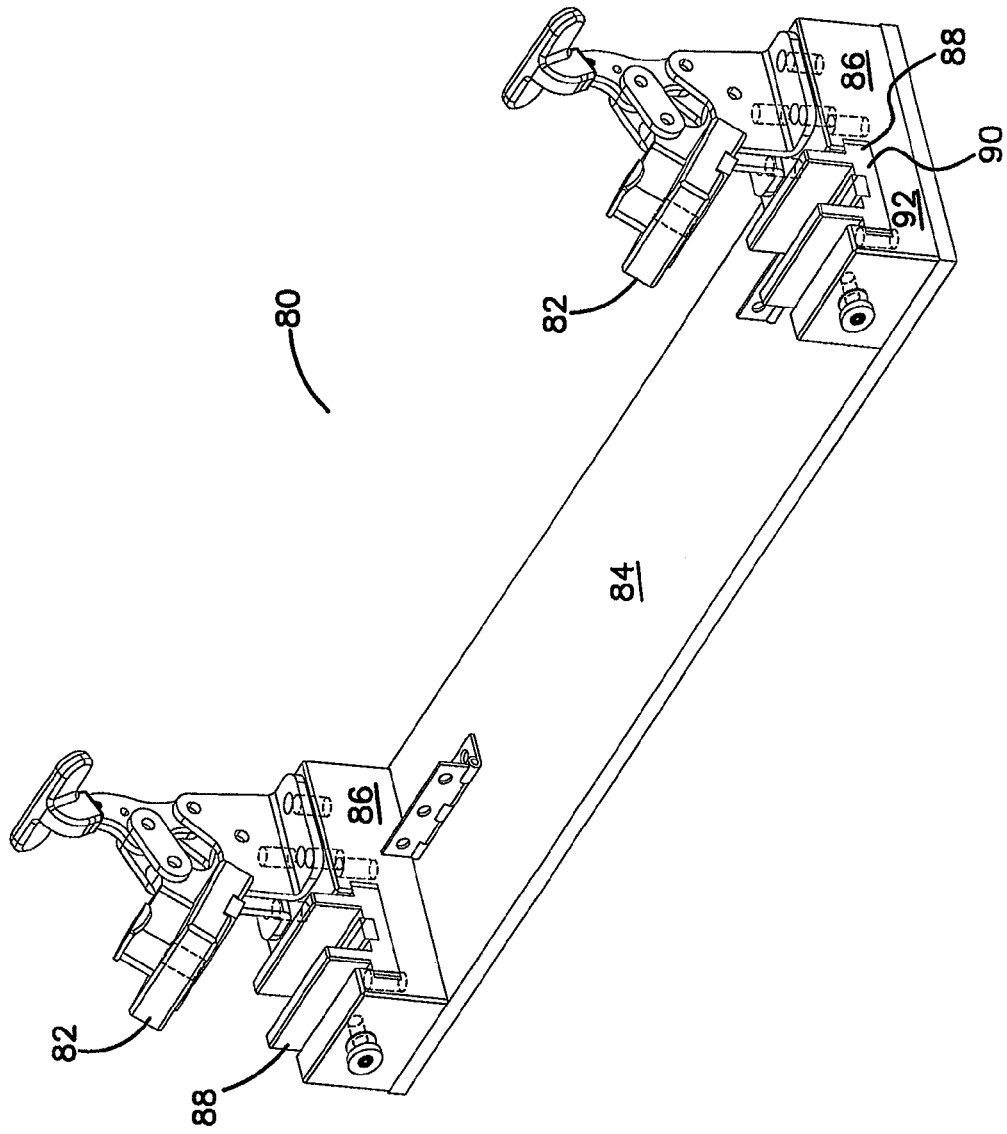
FIG. 8 is a perspective view of a partially disassembled cable holder of FIG. 7.
Figure 9:
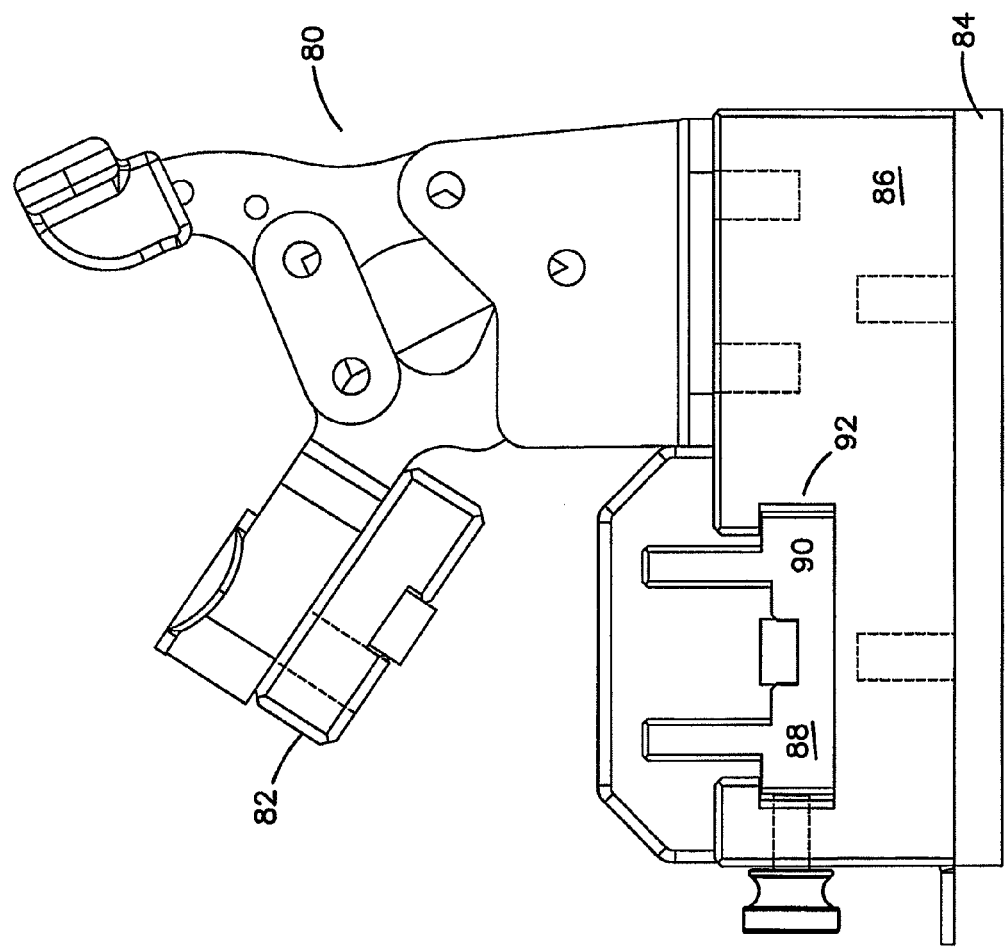
FIG. 9 is an end view of the cable holder of FIG. 7.

Referring to FIGS. 7-9, a second embodiment of the cable holder is shown. The cable holder 80 of the second embodiment is similar to the cable holder 10 of the first embodiment. Some differences relate to the shape of the clamp pads 82 and the shape of the base plate 84. Other differences relate to the manner in which the upper and lower clamp members are mounted to the base plate 84. The upper and lower clamp members of the cable holder 80 are mounted to the base plate 84 via mounting blocks 86. The mounting blocks eliminate the risers 36 shown in the first embodiment. In addition, the mounting blocks 86 provide an alternative quick release means for supporting the cable chuck 88. Instead of the boss and arms shown in the first embodiment, the base 90 of cable chuck 88 is engaged in channels 92 in the mounting block 86. FIG. 7 also depicts cable chuck 94 and cable chuck 96. Cable chucks 88, 94, 96 can be of different sizes and configurations. The appropriate cable chuck 88, 94, 96 can be selected to best fit the specific cable that will be used with the cable holder 80.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of creating a cable breakout comprising:
    positioning a section of a fiber distribution cable over two spaced apart cable chucks;
    clamping the section of fiber distribution cable against the spaced apart cable chucks;
    creating a splice between the clamped section of fiber distribution cable and separating at least one optical fiber from the fiber distribution cable;
    overmolding the splice; and
    releasing the clamped section of fiber distribution cable.

2. The method of claim 1, further comprising the step of covering the section of fiber distribution cable between the cable chucks during the overmolding process.

3. The method of claim 1, further comprising selecting cable chucks to match the size of the section of fiber distribution cable and connecting the cable chucks to a base plate.

4. The method of claim 1, wherein at least some optical fibers within the fiber distribution cable are not cut during the step of creating a splice between the clamped section of fiber distribution cable and separating at least one optical fiber from the fiber distribution cable.

5. The method of claim 1, wherein the fiber distribution cable includes a first end and a second end and the section of the fiber distribution cable that is clamped against the spaced apart cable chuck is spaced away from both the first and second ends of the fiber distribution cable.

6. The method of claim 1, wherein at least one of the cable chucks includes a first wall and an opposed second wall spaced apart on a chuck base member defining an upper opening configured to receive the section of fiber distribution cable.

7. The method of claim 6, wherein the clamping step presses the section of fiber distribution cable against the cable chuck base member.

8. The method of claim 1, wherein the steps occur in the following order:
    positioning, then clamping, then creating the splice, then overmolding, and then releasing.

9. The method of claim 1, wherein the step of clamping the section of fiber distribution cable against the spaced apart cable chucks includes actuating a clamp member which directly contacts an exterior portion of the section of fiber distribution cable and forces the section against a cable chuck.

10. A method of creating a cable breakout comprising:
    providing a fiber distribution cable including a first end portion and a second end portion and a mid portion therebetween;
    positioning a section of a fiber distribution cable from the mid portion of the fiber distribution cable over two spaced apart cable chucks;
    clamping the section of fiber distribution cable against the spaced apart cable chucks;
    creating a splice between the clamped section of fiber distribution cable and separating at least one optical fiber from the fiber distribution cable;
    overmolding the splice; and
    releasing the clamped section of fiber distribution cable,
    wherein the above steps are completed without access to the first or second end portions of the fiber distribution cable.

11. The method of claim 10, wherein the above steps can be completed without severing through the entire fiber distribution cable.

12. The method of claim 10, wherein the first end portion of the fiber distribution cable is connected to a first structure and the second end portion of the fiber distribution cable is connected to a second structure and wherein the above-recited steps are completed without disconnecting the first and second ends.

13. The method of claim 10, wherein at least one of the cable chucks includes a first wall and an opposed second wall spaced apart on a chuck base member defining an upper opening configured to receive the section of fiber distribution cable.

* * * * *